(12) United States Patent
Nagano et al.

(10) Patent No.: US 11,568,662 B2
(45) Date of Patent: Jan. 31, 2023

(54) INFORMATION PROCESSING APPARATUS FOR DETECTING A COMMON ATTRIBUTE INDICATED IN DIFFERENT TABLES AND GENERATING INFORMATION ABOUT THE COMMON ATTRIBUTE, AND INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Shinichi Nagano, Yokohama Kanagawa (JP); Ruigang Zhang, Kawasaki Kanagawa (JP); Mikito Iwamasa, Shinagawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 99 days.

(21) Appl. No.: 17/014,259

(22) Filed: Sep. 8, 2020

(65) Prior Publication Data

US 2021/0295029 A1    Sep. 23, 2021

(30) Foreign Application Priority Data

Mar. 17, 2020  (JP) .............................. JP2020-046704

(51) Int. Cl.
*G06V 30/00* (2022.01)
*G06V 30/412* (2022.01)
*G06V 30/418* (2022.01)

(52) U.S. Cl.
CPC .......... *G06V 30/412* (2022.01); *G06V 30/418* (2022.01)

(58) Field of Classification Search
CPC ........................... G06V 30/412; G06V 30/418
See application file for complete search history.

(56) References Cited

U.S. PATENT DOCUMENTS

| | | | | |
|---|---|---|---|---|
| 7,143,339 | B2* | 11/2006 | Weinberg | G06F 16/30 715/212 |
| 9,430,114 | B1* | 8/2016 | Dingman | G06F 16/25 |
| 9,715,487 | B2* | 7/2017 | Rapp | G06F 40/258 |
| 10,248,736 | B1* | 4/2019 | Carroll | G06F 16/211 |
| 10,635,856 | B2* | 4/2020 | Hlucka | G06F 40/177 |
| 10,635,897 | B2 | 4/2020 | Sunagawa et al. | |

(Continued)

FOREIGN PATENT DOCUMENTS

JP   2006-99236 A    4/2006
JP   WO2015/162889 A1    10/2015

(Continued)

*Primary Examiner* — Cesar B Paula
*Assistant Examiner* — David Faber
(74) *Attorney, Agent, or Firm* — Finnegan, Henderson, Farabow, Garrett & Dunner, LLP

(57) ABSTRACT

An embodiment of the present invention provides an information processing apparatus for detecting an attribute indicated in different tables in common and generating information about the attribute. An information processing apparatus as an embodiment of the present invention includes a detector and an information generator. The detector detects a common attribute indicated in a first table and a second table. The information generator generates information about the common attribute based on contents of the first table and the second table.

10 Claims, 9 Drawing Sheets

(56) References Cited

U.S. PATENT DOCUMENTS

| | | | |
|---|---|---|---|
| 10,649,965 B2* | 5/2020 | Barbas | G06F 16/214 |
| 11,263,185 B2* | 3/2022 | Al-Haimi | G16H 10/20 |
| 2001/0049699 A1* | 12/2001 | Pratley | G06F 40/177 |
| | | | 715/212 |
| 2005/0050068 A1* | 3/2005 | Vaschillo | G06F 16/25 |
| 2005/0120293 A1* | 6/2005 | Benhase | G06F 40/18 |
| | | | 715/217 |
| 2006/0080299 A1 | 4/2006 | Shimogori et al. | |
| 2012/0054174 A1* | 3/2012 | Gagnier | G06F 16/2457 |
| | | | 707/E17.054 |
| 2016/0378811 A1* | 12/2016 | Kapoor | G06F 16/957 |
| | | | 707/741 |
| 2017/0147715 A1 | 5/2017 | Izukura | |
| 2019/0205361 A1 | 7/2019 | Sato et al. | |
| 2021/0216761 A1* | 7/2021 | Srinivas | G06V 30/413 |
| 2022/0027740 A1* | 1/2022 | Dong | G06F 40/103 |

FOREIGN PATENT DOCUMENTS

| | | |
|---|---|---|
| JP | WO2018/025707 A1 | 2/2018 |
| JP | 2019-32704 A | 2/2019 |
| JP | 2019-79321 A | 5/2019 |
| WO | WO 2015/162889 A1 | 10/2015 |
| WO | WO 2018/025707 A1 | 2/2018 |

* cited by examiner

First Table

| Type Symbol | Thickness (mm) | Length (mm) |
|---|---|---|
| XXX | not less than 13 | not more than 180 |
| YYY | not less than 13 | not more than 230 |

Reference Relationship
(first table references second table)

| Material Symbol | Steel Plate Thickness | Steel Plate Length |
|---|---|---|
| XXX | not less than 10mm | not more than 200mm |
| YYY | not less than 15mm | not more than 250mm |

Second Table

Third Table

| Type Symbol | Yield Point or Yield Strength N/mm² Thickness mm | | | | | Pull Strength N/mm² Thickness mm | | Elongation Thickness mm | Specimen | % |
|---|---|---|---|---|---|---|---|---|---|---|
| | not more than 16 | more than 16 and not more than 40 | more than 40 and not more than 75 | more than 75 and not more than 100 | more than 100 and not more than 160 | more than 160 and not more than 200 | not more than 100 | more than 100 and not more than 200 | | |
| SM400A | | | | | | | 400~510 | 400~510 | not more than 5 | No. 5 | not less than 23 |
| SM400B | not less than 245 | not less than 235 | not less than 215 | not less than 215 | not less than 205 | not less than 195 | | | more than 5 and not more than 16 | No. 1A | not less than 18 |
| SM400C | | | | | — | — | | | more than 16 and not more than 50 | No. 1A | not less than 22 |
| | | | | | | | | | more than 40 | No. 4 | not less than 24 |

← Reference Relationship
(fourth table references third table)

Fourth Table

| Material Symbol | Yield Point or Yield Strength N/mm² Iron Plate Thickness mm | | | | | Pull Strength N/mm² Iron Plate Thickness mm | | Elongation Iron Plate Thickness mm | Specimen | % |
|---|---|---|---|---|---|---|---|---|---|---|
| | not more than 16 | more than 16 and not more than 40 | more than 40 and not more than 100 | | more than 100 and not more than 160 | more than 160 and not more than 200 | not more than 200 | 400~510 | | | |
| SM400A | | | | | | | | | not more than 5 | No. 5 | not less than 23 |
| SM400B | not less than 245 | not less than 235 | not less than 215 | | not less than 205 | not less than 195 | 400~510 | | more than 5 and not more than 16 | No. 1A | not less than 18 |
| SM400C | | | | | — | — | | | more than 16 and not more than 50 | No. 1A | not less than 22 |
| | | | | | | | | | more than 40 | No. 4 | not less than 24 |

```
In [1]: from z3 import *
        thickness, length = Reals(" thickness length" );                    # Variable declaration: thickness is represented as thickness and length is represented as length
        Table1_for_XXX = And(thickness >= 13, length <= 180)                # Define constraints for the thickness and length for the record "XXX" prescribed in the first table
        Table2_for_XXX = And(thickness >= 10, length <= 200)                # Define constraints for the thickness and length for the record "XXX" prescribed in the second table
        Constraint = Not(Implies(Table1_for_XXX, Table2_for_XXX))           # Define a constraint negating the entire implicational relation for the two constraints
        s = Solver()                    # Generate a determiner
        s.add(Constraint)               # Set the implicational relation to the determiner
        r = s.check();                  # Acquire a determination result
        print(r)                        # Output the determination result
        unsat
```

FIG. 8A

```
In [2]: thickness, length = Reals(" thickness length" );                    # Variable declaration: thickness is represented as thickness and length is represented as length
        Table1_for_YYY = And(thickness >= 13, length <= 230)                # Define constraints for the thickness and length for the record "YYY" prescribed in the first table
        Table2_for_YYY = And(thickness >= 10, length <= 250)                # Define constraints for the thickness and length for the record "YYY" prescribed in the second table
        Constraint = Not(Implies(Table1_for_YYY, Table2_for_YYY))           # Define a constraint negating the entire implicational relation for the two constraints
        s = Solver()                    # Generate a determiner
        s.add(Constraint)               # Set the implicational relation to the determiner
        r = s.check();                  # Acquire a determination result
        print(r)                        # Output the determination result
        sat
```

FIG. 8B

INFORMATION PROCESSING APPARATUS FOR DETECTING A COMMON ATTRIBUTE INDICATED IN DIFFERENT TABLES AND GENERATING INFORMATION ABOUT THE COMMON ATTRIBUTE, AND INFORMATION PROCESSING METHOD, AND NON-TRANSITORY COMPUTER READABLE MEDIUM

CROSS-REFERENCE TO RELATED APPLICATION (S)

This application is based upon and claims the benefit of priority from Japanese Patent Application No. 2020-046704, filed Mar. 17, 2020; the entire contents of which are incorporated herein by reference.

FIELD

An embodiment relates to an information processing apparatus, an information processing method, and a non-transitory computer readable medium.

BACKGROUND

For determining the dimension, quality, shape, material and the like of a product, various technical standards are referenced. For example, in addition to public standards such as international standards and national standards, there are often standards unique to companies, divisions and the like. The designer of the product may perform the design operation by comparing these multiple technical standards to satisfy all of the standards.

These technical standards may be created by referencing other technical standards. In that case, a referencing technical standard needs to be updated when a referenced technical standard is updated. For example, when a numerical range for an attribute A in a first technical standard is updated, the manager of technical standards needs to perform operations for detecting a portion where the attribute A appears in a document for a second technical standard referencing the first technical standard and updating the values indicated in that portion to numerical values within the range indicated in the first technical standard.

Because this situation causes unnecessary trouble to the designer, manager and the like, a technique for improving the efficiency of management of technical standards is desired. Design attributes in technical standards are typically indicated in tables. However, tables have various structures, and cells at the same positions in tables having a reference relationship do not necessarily indicate values for the same attribute. For that reason, there is a difficulty in simply comparing the tables. In addition, a technical document generally contains a plurality of tables, and even if technical documents are found to have a reference relationship, it may not be found which tables in the technical documents have the reference relationship.

BRIEF DESCRIPTION OF THE DRAWINGS

FIG. 2 is a diagram illustrating an example of tables having a reference relationship;

FIG. 4 is a diagram illustrating another example of tables having a reference relationship;

FIGS. 8A and 8B are diagrams illustrating determination scripts using a SAT tool.

DETAILED DESCRIPTION

An embodiment of the present invention provides an information processing apparatus for detecting an attribute indicated in different tables in common and generating information about the attribute.

An information processing apparatus as an embodiment of the present invention includes a detector and an information generator. The detector detects a common attribute indicated in a first table and a second table. The information generator generates information about the common attribute based on contents of the first table and the second table.

An embodiment will be explained in detail below with reference to the accompanying drawings. The present invention is not limited to the embodiment.

An Embodiment of the Present Invention

Figure 1:
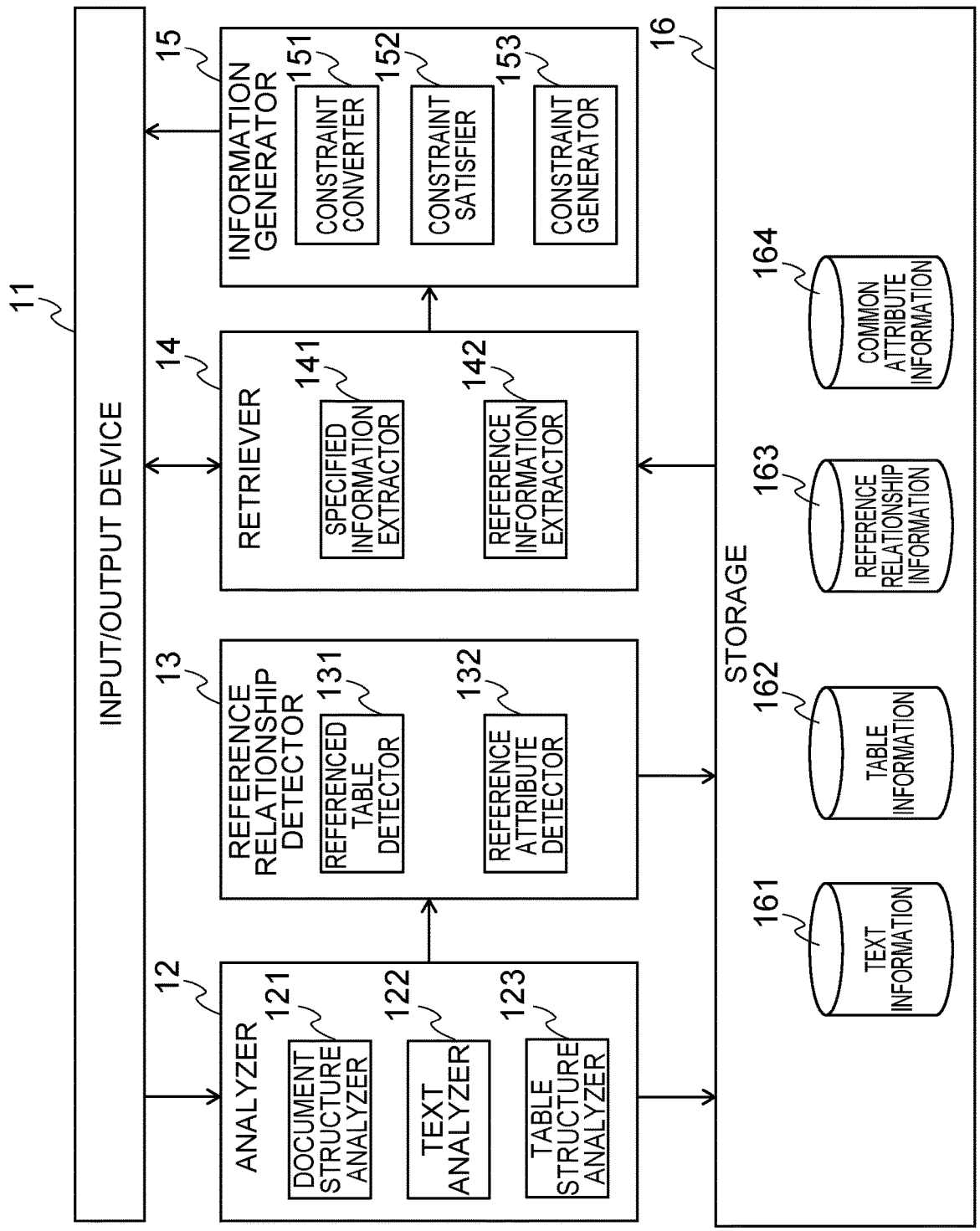
FIG. 1 is a block diagram illustrating an example of an information processing apparatus according to an embodiment of the present invention.

FIG. 1 is a block diagram illustrating an example of an information processing apparatus according to an embodiment of the present invention. An information processing apparatus 1 according to this embodiment includes an input/output device 11, an analyzer 12, a reference relationship detector 13, a retriever 14, an information generator 15 and a storage 16. The analyzer 12 includes a document structure analyzer 121, a text analyzer 122 and a table structure analyzer 123. The reference relationship detector 13 includes a referenced table detector 131 and a common attribute detector 132. The retriever 14 includes a specified information extractor 141 and a reference information extractor 142. The information generator 15 includes a constraint converter 151, a constraint satisfier 152 and a constraint generator 153.

The information processing apparatus 1 identifies tables having a reference relationship by detecting an attribute indicated in the different tables in common. The information processing apparatus 1 also generates information about the attribute based on contents indicated in the tables having the reference relationship. Hereinafter, the attribute is referred to as a common attribute.

FIG. 2 is a diagram illustrating an example of tables having a reference relationship. A first table and a second table shown in FIG. 2 indicate prescriptions about a steel material "XXX" and a steel material "YYY". For example, for manufacturing the steel material "XXX" so as to satisfy the prescriptions indicated in both tables, it should have a thickness not less than 13 mm and a length not more than 180 mm.

However, the table to be referenced is not necessarily located where it can be found at a glance. The table to be referenced may be contained in a different document. Also, even if it is contained in the same document, it may be contained in a different page. Thus, management of the table to be referenced and calculation of the above-mentioned conditions are preferably performed by machine, not by human.

However, there is a problem in automatically calculating the above-mentioned conditions in the example of FIG. 2. In the example of FIG. 2, attribute names indicated in column headings of the first table and attribute names indicated in column headings of the second table do not completely coincide. Accordingly, it is impossible to recognize that the attributes indicated in the first table and the attributes indicated in the second table are the same. For example, the attribute name indicated in the first column of the first table is "Type Symbol", and the attribute name indicated in the first column of the second table is "Material Symbol". Accordingly, the first column of the first table and the first column of the second table are not recognized as indicating the same information, i.e., types of steel materials. Also, a unit of mm is included in attribute names in the first table, but not included in attribute names in the second table.

Thus, the information processing apparatus 1 of this embodiment analyzes an electronic document provided and tables in the electronic document, and detects a common attribute based on the analysis result.

Note that the electronic document to be analyzed may be any analyzable electronic document such as an HTML (Hyper Text Markup Language) file or a PDF (Portable Document Format) file. For example, it may be a page of a website on the Internet. Note that the electronic document is not limited to a technical document as shown in FIG. 2. Also, information indicated by the tables may not be about a product. Also, generated information is not limited to a conditional formula.

The internal configuration of the information processing apparatus 1 will now be described. Note that the internal configuration shown in FIG. 1 is an example, and components not illustrated in FIG. 1 may be present in the information processing apparatus 1. Also, the components of the information processing apparatus 1 shown in FIG. 1 may be subdivided, or may be integrated. Also, the components shown in FIG. 1 may be included in an apparatus separate from the information processing apparatus 1. For example, the analyzer 12, the reference relationship detector 13, the retriever 14 and the information generator 15 may each be a separate apparatus. Also, for example, data for processing of the information processing apparatus 1 may be stored in a storage device such as a network area storage. That is, the storage 16 may be provided external to the information processing apparatus 1.

The input/output device 11 acquires information required for processing such as from an apparatus separate from the information processing apparatus 1, and outputs a processing result. Note that the input and output information is not particularly limited. For example, the input/output device 11 acquires an electronic document to be analyzed by the information processing apparatus 1, an identifier for identifying a table to be retrieved, and the like.

Figure 3:
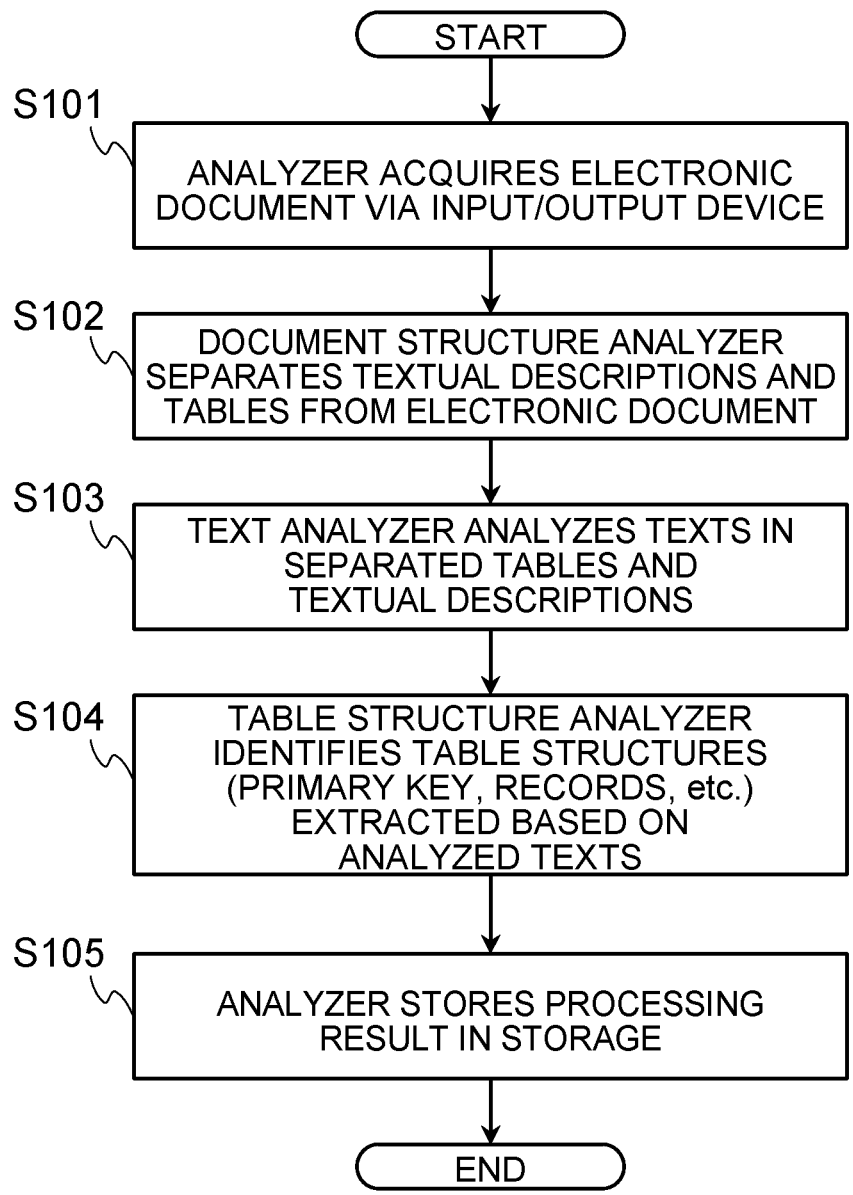
FIG. 3 is a diagram illustrating an example of a processing flow of an analyzer.

The analyzer 12 analyzes textual descriptions and tables included in an electronic document. FIG. 3 is a diagram illustrating an example of a processing flow of the analyzer 12. It is assumed that this flow is started when an electronic document is input to the input/output device 11.

The analyzer 12 acquires an electronic document via the input/output device 11 (S101). The document structure analyzer 121 of the analyzer 12 separates textual descriptions and tables from the electronic document (S102). Any known method may be used for the separation. For example, if the electronic document is a PDF file, various publicly-released extraction software and commands for extracting textual descriptions or tables may be used.

The text analyzer 122 of the analyzer 12 performs text analysis on each of the tables and textual descriptions separated from the electronic document (S103). For example, the text analyzer 122 detects whether a predetermined character string is included in the tables and textual descriptions. For example, a name that is likely to be a primary key for records of the tables is preset. The character string may be expressed in regular expressions.

The table structure analyzer 123 of the analyzer 12 identifies structures of the extracted tables (S104). For example, it is assumed that a character string "symbol" is preset as an attribute name that is likely to be a primary key. Then, when the tables shown in FIG. 2 are analyzed by the text analyzer 122, the table structure analyzer 123 can recognize that the tables of FIG. 2 contain attributes including the character string "symbol". If another name likely to be a primary key is not included in the tables of FIG. 2, the attributes including the character string "symbol" are determined as primary keys. That is, it is determined that the primary key of the first table is "Type Symbol" and the primary key of the second table is "Material Symbol". In this manner, the table structure analyzer 123 can identify the primary keys for the records even if there are what is called "orthographic variants".

The source code of an electronic document such as HTML or PDF includes tabs and the like for indicating table titles, headings and the like. Thus, the table structure analyzer 123 may analyze structures such as the locations of the headings in the tables based on the source code of the electronic document.

Although records are typically referenced to table rows, some tables indicate a plurality of records in one row. FIG. 4 is a diagram illustrating an example of tables having a reference relationship. In a third table and a fourth table shown in FIG. 4, some cells are combined. Although the third table and fourth table actually contain a record of SM400A and a record of SM400B, it is also possible to regard that there is a record of "SM400ASM400B".

In the case of tables having a structure as in FIG. 4, the table structure analyzer 123 identifies actual records. For example, a product name or the like is set in advance as a name that is likely to be regarded as one record. For example, SM400A, SM400B and SM400C are preset. The table structure analyzer 123 recognizes the character string "SM400ASM400B" based on the analyzed texts, and further recognizes that the character string includes two names. The recognition can be performed by using regular expression search.

When a plurality of particular names are recognized, the table structure analyzer 123 may divide the row corresponding to the character string into rows for the respective particular names. That is, records having the same value for each attribute may be created for the respective particular names. Alternatively, if it is recognized that a newline code, which means the start of a new line, is included in a cell, it may be regarded that the row corresponding to the cell includes a plurality of records, and the row may be divided by the newline code.

Whether a row or a column is added for the division may be determined based on whether subjects and attributes are arranged in a row or a column. For example, in FIG. 4, the same column as the above-mentioned cell in FIG. 4 contains "SM400C", which is a product name as well as "SM400A" and "SM400B". Accordingly, for dividing the above-mentioned cell in FIG. 4 into a cell indicating "SM400A" and a cell indicating "SM400B", a row is added.

As shown in FIG. 4, a column heading may extend across a plurality of rows. Although "Yield Point or Yield Strength N/mm$^2$", "Thickness mm" and "not more than 16" are indicated in respective separate cells in the example of FIG. 4, they should essentially be indicated in one cell. In the case of this type of tables, the table structure analyzer 123 may recognize the number of rows for a column heading and obtain a converted attribute name in which the column heading is indicated in one row. The number of rows for the column heading can be recognized based on the source code of the electronic document as described above. For example, in the example of FIG. 4, a converted attribute name such as "Yield Point or Yield Strength N/mm$^2$, Thickness mm, not more than 16" is obtained. In this manner, attribute names can be compared even between tables having different numbers of rows corresponding to column headings.

In this manner, the table structure analyzer 123 clarifies records and their attributes to make it easy to find a common attribute.

The analyzer 12 stores a processing result in the storage 16 (S105), and the flow ends. For example, text information 161 corresponding to the analyzed texts is stored. Table information 162 indicating the extracted tables and their structures may also be stored in association with the electronic document. This flow is thus performed every time an electronic document is input to the input/output device 11, so that information is accumulated in the storage 16.

Figure 5:
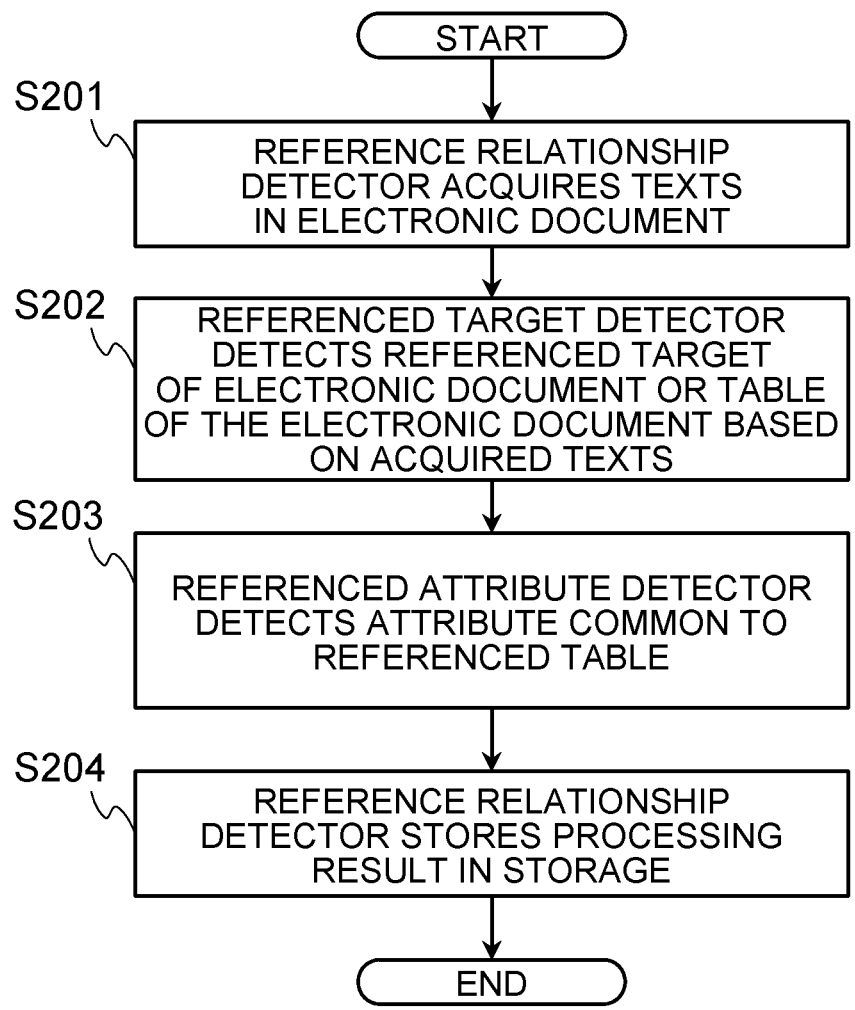
FIG. 5 is a diagram illustrating an example of a processing flow of a reference relationship detector.

For an electronic document, tables included in the electronic document, attributes included in the tables, and the like, the reference relationship detector 13 detects those referenced by them. FIG. 5 is a diagram illustrating an example of a processing flow of the reference relationship detector 13. This flow is performed after the processing of the analyzer 12 is performed. Note that the flow may be performed every time the processing of the analyzer 12 is performed, or may be collectively performed after the processing of the analyzer 12 is performed a plurality of times.

The referenced table detector 131 of the reference relationship detector 13 acquires the analyzed texts of the electronic document (S201). The texts may be acquired from the analyzer 12, or text information in the storage 16 may be used. The referenced table detector 131 detects a table referenced by the electronic document or a table in the electronic document based on the texts (S202).

For example, it is assumed that an electronic document A contains an electronic document B as a cited document. In that case, analyzed texts of the electronic document A contain the name of the electronic document B. The referenced table detector 131 may detect that the analyzed texts of the electronic document A contain the name of the electronic document B, and regard the electronic document B as an electronic document referenced by the electronic document A. The storage 16 may prestore the names of electronic documents expected to be cited, such as the name of the electronic document B, so that the referenced table detector 131 searches the texts for the names of those electronic documents. Alternatively, the analyzer 12 may store the names of input electronic documents in the storage 16, so that the referenced table detector 131 searches the texts for the names of the previously input electronic documents.

The referenced table detector 131 may also detect a character string indicating a reference relationship, such as "refer to", in the texts of the electronic document A. When the character string is detected, an electronic document or table that is the object of the character string may be regarded as having the reference relationship. The storage 16 may prestore a character string indicating a reference relationship. Also, for example, if the electronic document A contains a text "refer to table C in the cited document" in the textual descriptions around a table D while the electronic document B contains no mention to the electronic document A, it may be regarded that the electronic document A references the electronic document B and table D of the electronic document A references table C of the electronic document B. The direction of reference may thus be estimated.

Note that a misdetection may occur in the above-described method of identifying a reference relationship. Accordingly, instead of immediately determining the referenced table, it may be regarded as a candidate and, when a referenced attribute is detected by the common attribute detector 132, the candidate may be determined as the referenced table.

The common attribute detector 132 detects an attribute common to tables having a reference relationship (a common attribute) based on the text information 161, the table information 162 and the like (S203). For example, the common attribute detector 132 extracts a table of the electronic document A and a table of the electronic document B regarded as having a reference relationship from the storage 16, compares attributes in both tables to check whether the attributes coincide, and detects a common attribute indicated in both tables.

Note that the attributes may be regarded as coinciding even if the names of the attributes do not completely coincide. For example, in the example of FIG. 2, the attribute names "Type Symbol" and "Material Symbol" do not completely coincide. However, the common attribute detector 132 may convert "Type Symbol" and "Material Symbol" into a name "Symbol", and determine that the attributes coincide based on the coincidence of the character strings "XXX" and "YYY" contained in the rows of the column corresponding to the primary key. The method for the conversion may be to preset a character string to be regarded as being significant and delete portions other than the character string if the character string is included. Alternatively, translation or the like may be prestored to convert one of "Type Symbol" and "Material Symbol" into the other. In this manner, the common attribute may be detected by converting at least one of the attribute name in the first table and the attribute name in the second table.

Attributes having a reference relationship is not necessarily in a one-to-one relationship. For example, the third table shown in FIG. 4 contains an attribute "Yield Point or Yield Strength N/mm$^2$, Thickness mm, more than 40 and not more than 75" and an attribute "Yield Point or Yield Strength N/mm$^2$, Thickness mm, more than 75 and not more than 100 or" enclosed in a rectangular frame. The values for these attributes are the same value of "not less than 215", and the fourth table contains an attribute having a reference relationship with these attributes in a combined form of "Yield Point or Yield Strength N/mm$^2$, Thickness mm, more than 40 and not more than 100". Like this, a plurality of attributes may be combined into one in a table having a reference relationship.

To deal with those cases, the common attribute detector 132 converts an attribute name consisting of particular phrases such as "not less than", "not more than", "less than" and "more than" and numerical values into a mathematical formula. The conversion may be performed based on a correspondence table indicating correspondence between the phrases to be converted and converted mathematical symbols, and the storage 16 may prestore the correspondence table.

For example, "Yield Point or Yield Strength N/mm², Thickness mm, more than 40 and not more than 75" in the first table is converted as "40<Yield Point or Yield Strength N/mm², Thickness mm≤75". Similarly, "Yield Point or Yield Strength N/mm², Thickness mm, more than 40 and not more than 100" in the second table is converted as "40<Yield Point or Yield Strength N/mm², Thickness mm≤100". In this manner, it can be determined that the converted attribute of the first table is included in the converted attribute of the second table and they have a reference relationship.

Note that, if electronic documents having a reference relationship are found but tables having a reference relationship are not known, the referenced table detector 131 may search each table in the electronic documents having the reference relationship for a common attribute to detect the tables having the reference relationship.

The reference relationship detector 13 stores a processing result in the storage 16 (S204), and the flow ends. For example, reference relationship information 163 indicating reference relationships between electronic documents and tables is stored. Common attribute information 164 indicating a common attribute of tables having a reference relationship may also be stored. In this manner, information about reference relationships between electronic documents input to the input/output device 11 and tables included in them is accumulated.

Figure 6:
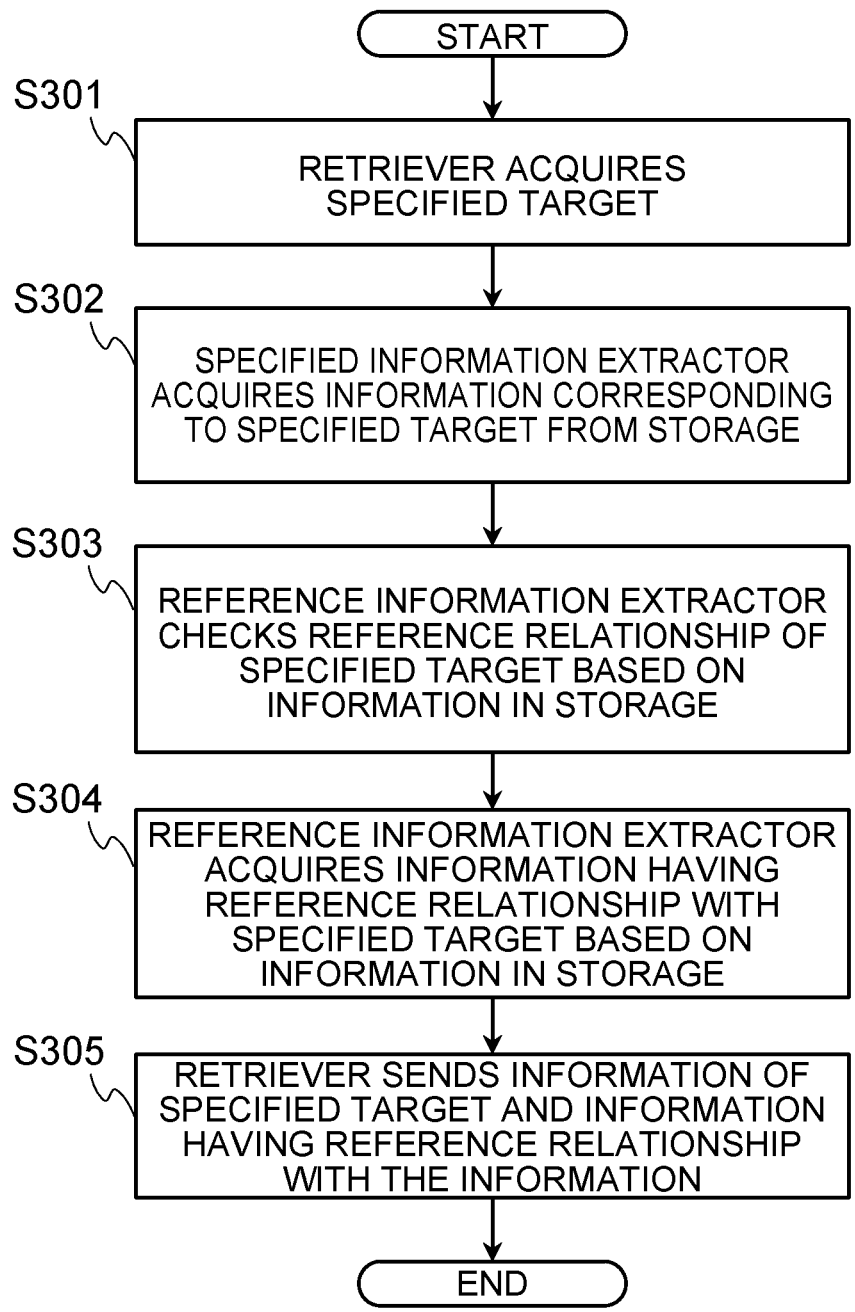
FIG. 6 is a diagram illustrating an example of a processing flow of a retriever.

The retriever 14 acquires information about a retrieved target specified by a user from the storage 16. FIG. 6 is a diagram illustrating an example of a processing flow of the retriever 14. It is assumed that this flow is started when a specified target is input to the input/output device 11.

The retriever 14 acquires information corresponding to the specified target via the input/output device 11 (S301). For example, identifiers such as the names of an electronic document and a table thereof may be specified as the retrieved target. Also, an attribute in a table may be specified, or a text included in a table may be specified. For example, "XXX" shown in FIG. 2 or the like may be specified.

The specified information extractor 141 of the retriever 14 acquires information corresponding to the specified target from the storage 16 (S302). For example, the entire part of an electronic document and a table stored in the storage 16 may be extracted, or a table portion such as a record or a cell may be extracted.

The reference information extractor 142 of the retriever 14 checks a reference relationship for the specified target from the storage 16 based on the reference relationship information 163, the common attribute information 164 (S303) and the like. Then The reference information extractor 142 extracts information having the reference relationship from the table information 162. In other word, the reference information extractor 142 acquires information having reference relationship with the specified target (S304). For example, if the first table in FIG. 2 and the text "XXX" are specified, a reference relationship with the second table of FIG. 2 can be recognized based on the reference relationship information 163, and thus the reference information extractor 142 may extract a record corresponding to "XXX" in the second table in FIG. 2. Further, if "thickness" is specified, it can be recognized that "thickness" corresponds to "Steel Plate Thickness" in the second table based on the common attribute information 164, and thus the reference information extractor 142 may extract the cell "not less than 10 mm" corresponding to "XXX" and "Steel Plate Thickness" in the second table in FIG. 2.

The retriever 14 sends information of the specified target and information having a reference relationship with the information (S305). The destination may be the input/output device 11. In that case, the user will check the contents of the specified record and the referenced record. The destination may also be the information generator 15. Alternatively, those pieces of information may be stored in the storage 16 and provided to the information generator 15 via the storage 16. In those cases, the information generator 15 will generate new information based on those pieces of information.

The information generator 15 generates and provides information corresponding to the specified target. For example, the information generator 15 generates information about a common attribute based on the contents of a specified table and a table referenced by the table. Specifically, information about a common attribute is generated based on a text indicated in a cell present in a column corresponding to the common attribute in the specified table and a text indicated in a cell present in a column corresponding to the common attribute in the referenced table. Note that, if headings are arranged in a row instead of a column, "a column corresponding to the common attribute" may be read as "a row corresponding to the common attribute".

Figure 7:
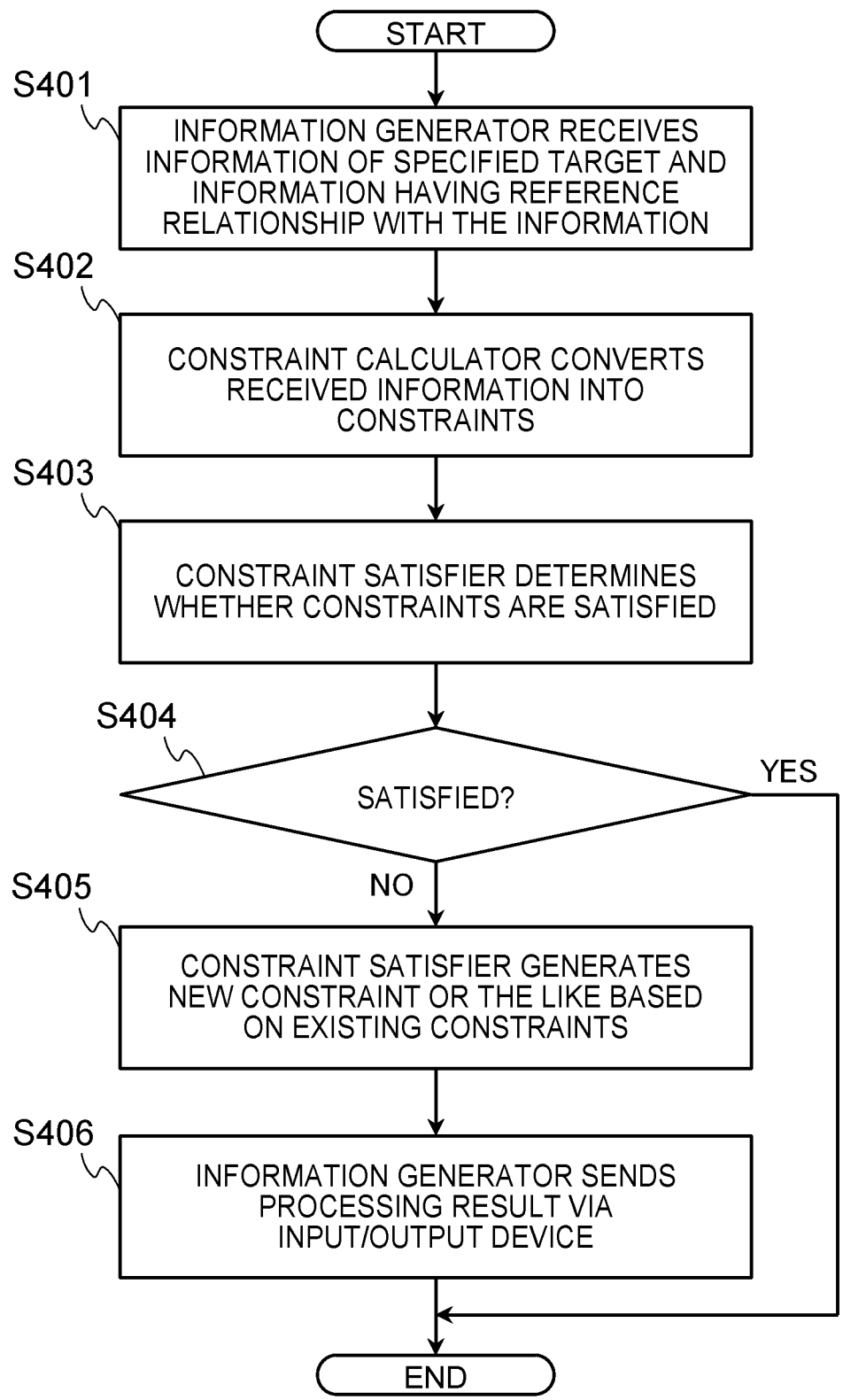
FIG. 7 is a diagram illustrating an example of a processing flow of an information generator.

Note that, although various information may be generated, this embodiment assumes that a constraint indicating a numerical value or numerical range is contained in the specified table. FIG. 7 is a diagram illustrating an example of a processing flow of the information generator 15. It is assumed that this flow is started when a retrieval result is received from the retriever 14.

The information generator 15 receives information of the specified target and information having a reference relationship with the information (S401). In this example, the first table shown in FIG. 2 and the second table referenced by it are received.

For example, if the first table shown in FIG. 2 prescribes a company technical standard and the second table prescribes a national technical standard, it is necessary to determine whether the prescription of each record of the first table satisfies the prescription of the corresponding record of the second table. In this embodiment, this determination processing is regarded as a satisfiability problem (SAT) for propositional formulas in the field of mathematical logic. A propositional formula is a mathematical expression for expressing a constraint condition. It will be simply referred to as a constraint hereinafter. The information generator 15 solves the satisfiability problem using a determination tool referred to as a SAT tool. Satisfiability problems and SAT tools are widely used in the fields of computer science, artificial intelligence and the like, and those SAT tools may be used.

The constraint converter 151 of the information generator 15 converts received information into a constraint (S402). Specifically, a text indicated in each cell of both received tables is converted into a constraint. Note that only a text indicated in a cell corresponding to the common attribute may be converted into a constraint. The constraint converter 151 converts phrases such as "not less than", "not more than", "less than" and "more than" into mathematical symbols based on a predetermined conversion rule, as with the common attribute detector 132 mentioned above.

For example, the record of "XXX" in the first table is converted into a constraint "thickness≥13 □length≤180".

Here, "∧" represents AND, meaning that it is true if the two constraints "thickness≥13" and "length≤180" hold at the same time. Similarly, the record of "XXX" in the second table is converted into a constraint "thickness≥10∧length≤200".

Next, for the record of "XXX", it is necessary that the constraint "thickness≥13∧length≤180" prescribed in the first table is implied by the constraint "thickness≥10∧length≤200" prescribed in the second table. This is expressed by a constraint "thickness 13∧length≤⇒180 thickness≥10∧length≤200". Here, "⇒" represents an implicational relation, meaning that it is true if the constraint "thickness≥10∧length≤200" holds when the constraint "thickness≥13∧length≤180" holds.

The constraint satisfier 152 of the information generator 15 determine whether these constraints are satisfied (that is, whether they hold or not) (S403). If they are not satisfied (NO in S404), the constraint generator 153 generates a new constraint based on these constraints (S405).

For example, in order that the prescription of each record of the first table satisfies the prescription of the corresponding record of the second table, it is necessary that the constraint representing the implicational relation mentioned above is always true (i.e., valid) even when, regarding the thickness and length as variables, any values are assigned to both variables. This is because the presence of assignment of values to the variables such that the implicational relation does not hold means that there is a case that the prescriptions of the first table do not satisfy the prescriptions of the second table.

For example, for the record of "XXX" in the first table, the constraint "thickness≥13∧length≤180" prescribed in the first table and the constraint "thickness≥10∧length≤200" prescribed in the second table are concurrently and always true even when any values are assigned to both variables of thickness and length, and therefore the constraint representing the implicational relation "thickness≥13∧length≤180 thickness≥10∧length≤200" is always true (valid).

On the other hand, for the record of "YYY", if the thickness is 13 and the length is 230, for example, the constraint "thickness≥13∧length≤230" prescribed in the first table is true while the constraint "thickness≥15∧length≤250" prescribed in the second table is false, and therefore the constraint representing the implicational relation "thickness≥13∧length≤230⇒thickness≥15∧length≤250" is false and does not hold.

Thus, it can be determined whether the constraint representing the implicational relation is valid by checking whether it is true or false when values are assigned to each variable in order. However, it requires an enormous amount of time to comprehensively check all the combinations of values that the variables can take.

Thus, in this embodiment, the determination is performed without comprehensively checking the combinations. That a constraint P is valid is equivalent to that there is no assignment of values to variables such that ¬P, which is the negation of P, is true. Conversely, if there is only one assignment of values to the variables such that ¬P is true, it means that there is an assignment of values to the variables such that P is false, and therefore P is not valid. In this embodiment, using this nature, a constraint negating the constraint representing the implicational relation is generated to check that there is no assignment of values to the variables such that it is true, in order to determine that the constraint representing the implicational relation is valid.

The check uses a SAT tool. Using the SAT tool, it can be automatically determined whether or not there is an assignment to variables such that a propositional formula is true.

FIGS. 8A and 8B are diagrams illustrating determination scripts using a SAT tool. FIG. 8A illustrates an example of a determination script for the record of "XXX". FIG. 8B illustrates an example of a determination script for the record of "YYY". These scripts are generated using a python implementation of Z3, which is one of representative SAT tools. The determination results are represented by "unsat" or "sat" at the bottom of FIGS. 8A and 8B.

As shown in FIG. 8A, the determination result for the record of "XXX" is "unsat", which means that there is no assignment of values to the variables such that the negating constraint is true. Therefore, its negation i.e., the constraint representing the implicational relation is valid, it can be considered that the prescription of the first table satisfies the prescription of the second table for the record of "XXX".

The determination result for the record of "YYY" is "sat", which means that there is an assignment of values to the variables such that the negating constraint is true. Therefore, its negation i.e., the constraint representing the implicational relation is not valid, it cannot be considered that the prescription of the first table satisfies the prescription of the second table for the record of "YYY". This result is consistent with the above description that the constraint representing the implicational relation "thickness≥13∧length≤230⇒thickness≥15∧length≤250" is false when the thickness is 13 and the length is 230.

If the determination result is false, the constraint satisfier 152 generates a new constraint. Various constraints may be generated depending on the application of the information processing apparatus 1. For example, loosening the constraint for the record of "XXX" in the first table can be considered. The constraint "thickness≥13, length≤230" for "XXX" in the first table can be loosened to 10 for "thickness" and to 200 for "length". Thus, the constraint generator 153 may generate a new constraint in which the "thickness" of "XXX" is not less than 10 and not more than 13, or may indicate an allowable loosening range such as "10≤adjustable thickness≥13". As described above, if the constraint of the first table is included in the constraint of the second table, the information generator 15 may generate information for being included in the constraint of the second table but not included in the constraint of the first table.

Also, for example, tightening the constraint for the record of "YYY" in the first table can be considered. In the above-mentioned example, the constraint "thickness≥13, length≤230" for "YYY" in the first table cannot satisfy the constraint of the second table unless "thickness" is not less than 15. Thus, the constraint generator 153 may produce a new constraint in which the "thickness" is not less than 15, or may indicate a range to be satisfied such as "thickness to be satisfied≥15". As described above, if the constraint of the first table is not included in the constraint of the second table, the information generator 15 may calculate information for being included in the constraint of the second table.

The constraint generator 153 may also generate a new constraint that satisfies both of the constraint of the first table and the constraint of the second table. Alternatively, a constraint that does not satisfy both may be generated.

The information generator 15 sends information such as these new constraints via the input/output device 11 (S406). In response, the user can recognize whether there is a contradiction between the tables having the reference relationship, and recognize a numerical value or range allowable to loosen or to be satisfied for the common attribute.

As described above, the information processing apparatus 1 of this embodiment detects, based on the contents of an electronic document, a table included in the electronic document and the like, a table having a reference relationship with the table. Also, texts (for example, attribute names and cell contents) indicated in the tables having the reference relationship are analyzed, to detect a common attribute of the tables having the reference relationship based on the analysis result. In this manner, attributes whose names do not completely coincide can even be recognized as the same attribute. Then, information is generated based on the texts for the detected common attribute, which can eliminate the trouble of referencing individual documents and tables.

Also, reference relationships between documents and reference relationships between tables can be detected and stored. For example, this can eliminate operational trouble such as performing management by using a separately prepared document describing the reference relationships between the tables and documents, improving the management efficiency. Also, for example, it can be easily recognized whether a value in a table needs to be updated when a value indicated in another table is updated.

Note that at least part of the above embodiment may be realized by a dedicated electronic circuit (i.e., hardware) such as an IC (Integrated Circuit) having integrated therein a processor, a memory and the like. At least part of the above embodiment may be realized by executing software (programs). For example, the processing in the above embodiment can be realized by using a general-purpose computer apparatus as basic hardware to cause a processor such as a CPU provided to the computer apparatus to execute programs.

For example, a computer can be used as the apparatus of the above embodiment by causing the computer to read dedicated software stored in a computer-readable storage medium. The type of the storage medium is not particularly limited. Also, the computer can be used as the apparatus of the above embodiment by causing the computer to install dedicated software downloaded via a communication network. In this manner, information processing by the software is concretely implemented by using hardware resources.

Figure 9:
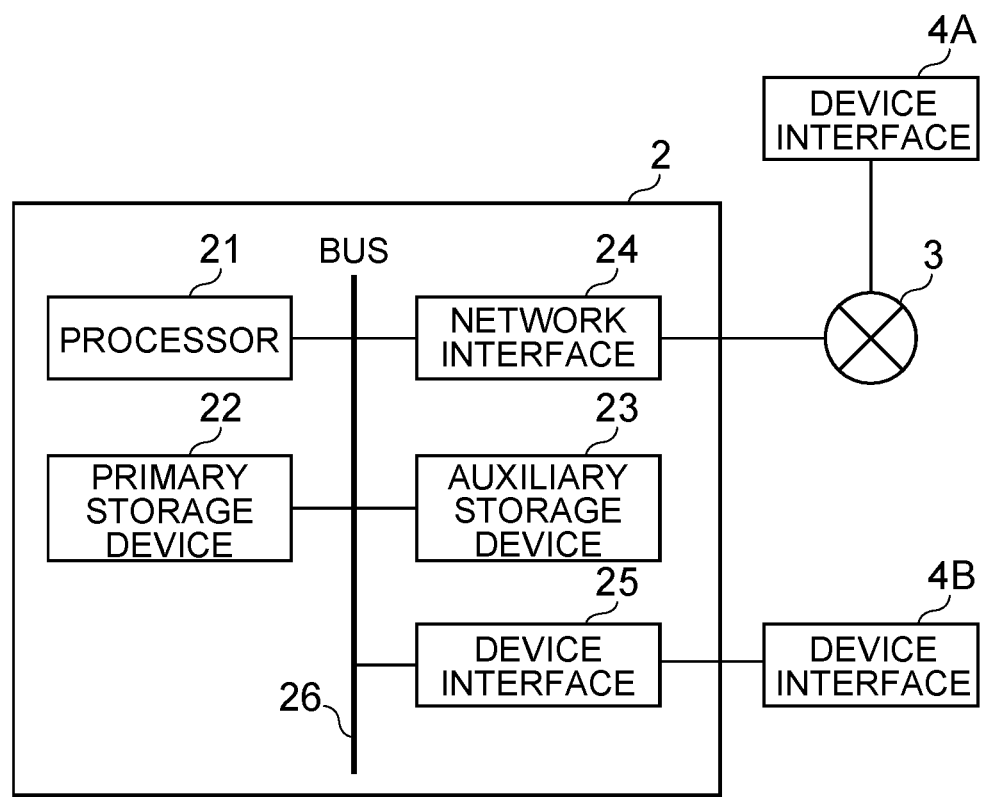
FIG. 9 is a block diagram illustrating an example of a hardware configuration in an embodiment of the present invention.

FIG. 9 is a block diagram illustrating an example of a hardware configuration in an embodiment of the present invention. The information processing apparatus 1 can be realized as a computer apparatus 2 including a processor 21, a primary storage device 22, an auxiliary storage device 23, a network interface 24 and a device interface 25, which are connected via a bus 26. The storage 16 can be realized by the primary storage device 22 or the auxiliary storage device 23, and other components can be realized by the processor 21.

Note that, although the computer apparatus 2 of FIG. 9 includes one for each component, it may include a plurality of identical components. Also, although one computer apparatus 2 is shown in FIG. 9, software may be installed on a plurality of computer apparatuses so that the plurality of computer apparatuses each execute different part of processing of the software.

The processor 21 is an electronic circuit including a control device and an operation device of the computer. The processor 21 performs operation processing based on data and programs input from devices or the like in the internal configuration of the computer apparatus 2, and outputs operation results and control signals to the devices or the like. Specifically, the processor 21 executes an OS (Operating System) of the computer apparatus 2, applications and the like, and controls the devices constituting the computer apparatus 2. The processor 21 is not particularly limited as long as it can perform the above processing.

The primary storage device 22 is a storage device to store instructions executed by the processor 21, various data and the like, and information stored in the primary storage device 22 is directly read by the processor 21. The auxiliary storage device 23 is a storage device other than the primary storage device 22. Note that these storage devices refer to any electronic components capable of storing electronic information, and may be memories or storages. The memories include volatile memories and non-volatile memories, either of which may be used.

The network interface 24 is an interface for connecting to a communication network 3 in a wireless or wired manner. Any network interface conforming to an existing communication standard may be used as the network interface 24. The network interface 24 may perform information exchange with an external device 4A communicatively connected via the communication network 3.

The device interface 25 is an interface such as a USB in direct connection with an external device 4B. The external device 4B may be an external storage medium, or may be a storage device such as a database.

The external devices 4A and 4B may be output devices. For example, the output devices may be display devices for displaying images, or may be devices for outputting sounds, or the like. Examples include an LCD (Liquid Crystal Display), a CRT (Cathode Ray Tube), a PDP (Plasma Display Panel), a speaker and the like, there is no limitation thereto.

Note that the external devices 4A and 4B may also be input devices. The input devices include devices such as a keyboard, a mouse and a touch panel, and provide information input by these devices to the computer apparatus 2. The signals from the input devices are output to the processor 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
   an electronic circuit configured to perform a method comprising:
     detecting a common attribute indicated in a first table and a second table; and
     converting a text indicated in a first cell that is in a row or a column corresponding to the common attribute in the first table into a first constraint regarding a first condition, converting a text indicated in a second cell that is in a row or a column corresponding to the common attribute in the second table into a second constraint regarding a second condition, and generating a third constraint including information about the common attribute based on contents of the first table and the second table,
   wherein generating the third constraint comprises:
     determining whether a fourth constraint is true or false, the fourth constraint being that the second constraint holds whenever the first constraint holds; and generating the third constraint when the fourth constraint is determined to be false.

2. The information processing apparatus according to claim 1, wherein
detecting the common attribute comprises detecting a table having a reference relationship with the first table or a second electronic document including a table having a reference relationship with the first table based on a text in a first electronic document including the first table.

3. The information processing apparatus according to claim 1, wherein
generating the third constraint comprises determining that the fourth constraint is false when confirming that there is an assignment of a value to a variable of the fifth constraint such that a fifth constraint negating the fourth constraint is true.

4. An information processing apparatus comprising:
an electronic circuit configured to perform a method comprising:
detecting a common attribute indicated in a first table and a second table; and
converting a text indicated in a first cell that is in a row or a column corresponding to the common attribute in the first table into a first constraint regarding a first condition, converting a text indicated in a second cell that is in a row or a column corresponding to the common attribute in the second table into a second constraint regarding a second condition, and generating a third constraint as information about the common attribute based on the first constraint and the second constraint,
wherein
when the first constraint is included in the second constraint, the third constraint is not included in the first constraint but is included in the second constraint.

5. The information processing apparatus according to claim 1, wherein
when the first constraint is not included in the second constraint, the third constraint is included in the second constraint.

6. The information processing apparatus according to claim 1, wherein
the third constraint satisfies the first constraint and the second constraint.

7. The information processing apparatus according to claim 1, wherein the electronic circuit is further configured to identify a primary key of a record included in the first table and a primary key of a record included in the second table, wherein
a primary key of a record for the first cell and a primary key of a record for the second cell coincide.

8. The information processing apparatus according to claim 1, wherein
the detecting the common attribute comprises detecting the common attribute by converting at least one of an attribute name in the first table and an attribute name in the second table.

9. An information processing method comprising:
detecting a common attribute indicated in a first table and a second table; and
converting a text indicated in a first cell that is in a row or a column corresponding to the common attribute in the first table into a first constraint regarding a first condition, converting a text indicated in a second cell that is in a row or a column corresponding to the common attribute in the second table into a second constraint regarding a second condition, and generating a third constraint as information about the common attribute based on the first constraint and the second constraint,
wherein generating the third constraint comprises:
determining whether a fourth constraint is true or false, the fourth constraint being that the second constraint holds whenever the first constraint holds; and
generating the third constraint when the fourth constraint is determined to be false.

10. A non-transitory computer readable medium having stored thereon a program comprising:
detecting a common attribute indicated in a first table and a second table; and
converting a text indicated in a first cell that is in a row or a column corresponding to the common attribute in the first table into a first constraint regarding a first condition, converting a text indicated in a second cell that is in a row or a column corresponding to the common attribute in the second table into a second constraint regarding a second condition, and generating a third constraint as information about the common attribute based on the first constraint and the second constraint,
wherein generating the third constraint comprises:
determining whether a fourth constraint is true or false, the fourth constraint being that the second constraint holds whenever the first constraint holds; and
generating the third constraint when the fourth constraint is determined to be false.

* * * * *

UNITED STATES PATENT AND TRADEMARK OFFICE
CERTIFICATE OF CORRECTION

| | |
|---|---|
| PATENT NO. | : 11,568,662 B2 |
| APPLICATION NO. | : 17/014259 |
| DATED | : January 31, 2023 |
| INVENTOR(S) | : Shinichi Nagano et al. |

It is certified that error appears in the above-identified patent and that said Letters Patent is hereby corrected as shown below:

On the Title Page

Item (54) and in the Specification, Column 1, Line 1, delete:
"INFORMATION PROCESSING APPARATUS FOR DETECTING A COMMON ATTRIBUTE INDICATED IN DIFFERENT TABLES AND GENERATING INFORMATION ABOUT THE COMMON ATTRIBUTE, AND INFORMATION PROCESSING METHOD, AND NON-TRANSITORY COMPUTER READABLE MEDIUM"

And insert the following:
--INFORMATION PROCESSING APPARATUS FOR DETECTING A COMMON ATTRIBUTE INDICATED IN DIFFERENT TABLES AND GENERATING INFORMATION ABOUT THE COMMON ATTRIBUTE, INFORMATION PROCESSING METHOD, AND NON-TRANSITORY COMPUTER READABLE MEDIUM--.

Signed and Sealed this
Eighth Day of August, 2023

*Katherine Kelly Vidal*
Katherine Kelly Vidal
*Director of the United States Patent and Trademark Office*